(12) United States Patent
Fang

(10) Patent No.: US 7,714,745 B2
(45) Date of Patent: May 11, 2010

(54) WIRELESS WHEEL-SENSOR SYSTEM FOR DEAD RECKONING NAVIGATION APPLICATIONS

(75) Inventor: Ron Fang, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 233 days.

(21) Appl. No.: 11/928,983

(22) Filed: Oct. 30, 2007

(65) Prior Publication Data

US 2009/0109066 A1    Apr. 30, 2009

(51) Int. Cl.
*G08G 1/23* (2006.01)
(52) U.S. Cl. .................. 340/988; 340/444; 340/447; 340/426.33; 340/539.1; 701/209; 701/210
(58) Field of Classification Search ............... 340/988, 340/442, 444, 447, 448, 426.33, 438, 455, 340/539.1, 825.69; 701/209, 210
See application file for complete search history.

(56) References Cited

U.S. PATENT DOCUMENTS

| | | | | |
|---|---|---|---|---|
| 5,825,286 | A * | 10/1998 | Coulthard | 340/447 |
| 6,292,719 | B1 * | 9/2001 | Seto et al. | 701/1 |
| 7,187,273 | B2 * | 3/2007 | Rieck et al. | 340/443 |
| 7,411,488 | B2 * | 8/2008 | Watabe et al. | 340/442 |
| 2003/0048178 | A1 * | 3/2003 | Bonardi et al. | 340/442 |
| 2003/0197603 | A1 * | 10/2003 | Stewart et al. | 340/442 |
| 2008/0117037 | A1 * | 5/2008 | Kenny et al. | 340/447 |

\* cited by examiner

*Primary Examiner*—Hung T. Nguyen
(74) *Attorney, Agent, or Firm*—Fogg & Powers LLC

(57) ABSTRACT

A dead-reckoning sensory system includes a receiver unit and a transmitter unit in wireless communication with the receiver unit. The transmitter unit is operable to be mounted to a wheel of a vehicle, determine information characterizing the heading and distance traveled by the vehicle, and transmit the information to the receiver unit.

16 Claims, 3 Drawing Sheets

WIRELESS WHEEL-SENSOR SYSTEM FOR DEAD RECKONING NAVIGATION APPLICATIONS

FIELD OF THE INVENTION

Embodiments of the invention relate generally to sensor systems and, more particularly, to sensor systems directed to dead-reckoning determination.

BACKGROUND OF THE INVENTION

In vehicle and other navigation applications, a low-cost dead-reckoning system requires accurate measurement of vehicle heading and distance traveled. Vehicle odometer sensors are either difficult to access or not available. Most wheel sensors do not provide rotational sense information, and a forward/backward sensor must be used. Heading information must be provided by other sensors such as a gyroscope or compass.

SUMMARY OF THE INVENTION

In an embodiment of the invention, a dead-reckoning sensory system includes a receiver unit and a transmitter unit in wireless communication with the receiver unit. The transmitter unit is operable to be mounted to a wheel of a vehicle, determine information characterizing the heading and distance traveled by the vehicle, and transmit the information to the receiver unit.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
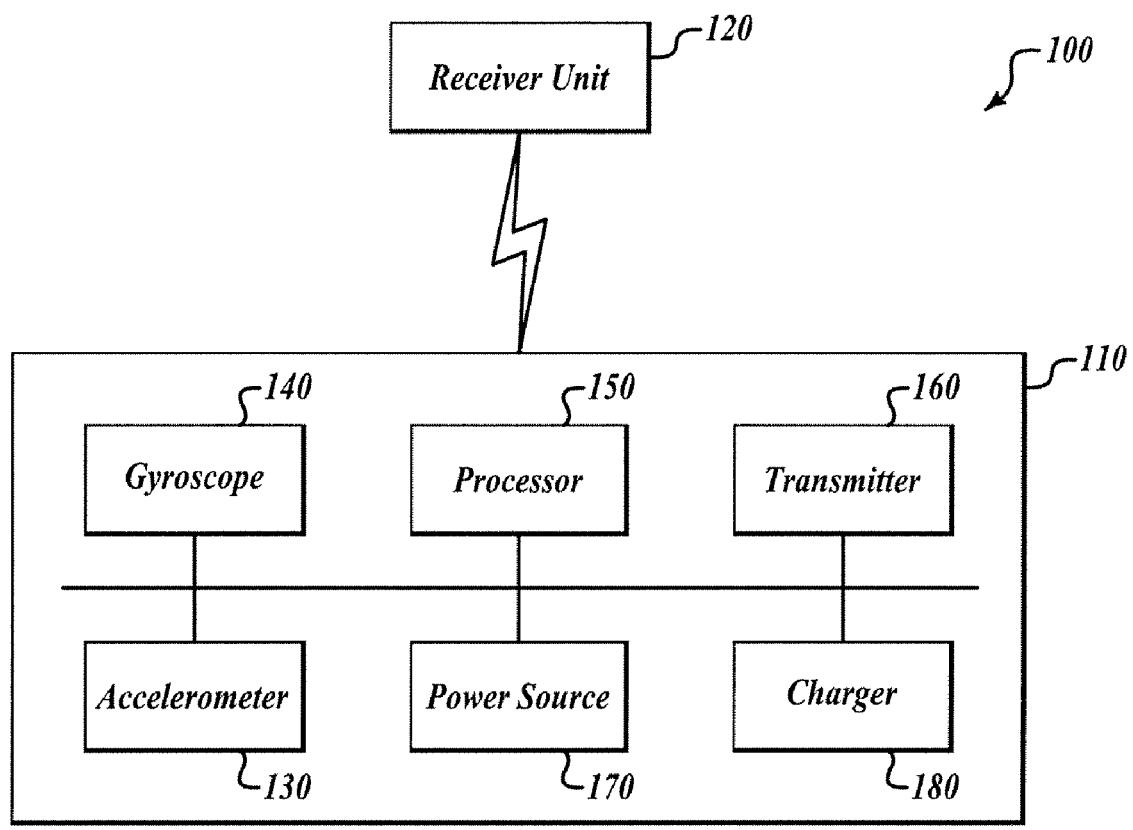
FIG. 1 is a functional block diagram of an embodiment of the invention.

As illustrated in FIG. 1, a wireless wheel sensor system 100 may include a transmitter unit 110 that can be mounted to a wheel 300 (FIG. 3) of a vehicle 200 (FIG. 2), such as an automobile, and a receiver unit 120 that can be anywhere on, in or within a predetermined range of the vehicle. In an embodiment, the transmitter unit 110 includes a dual-axis accelerometer 130, a gyroscope 140, a microprocessor 150, a wireless transmitter 160, such as an antenna, and a power source 170, such as a battery.

Figure 3:
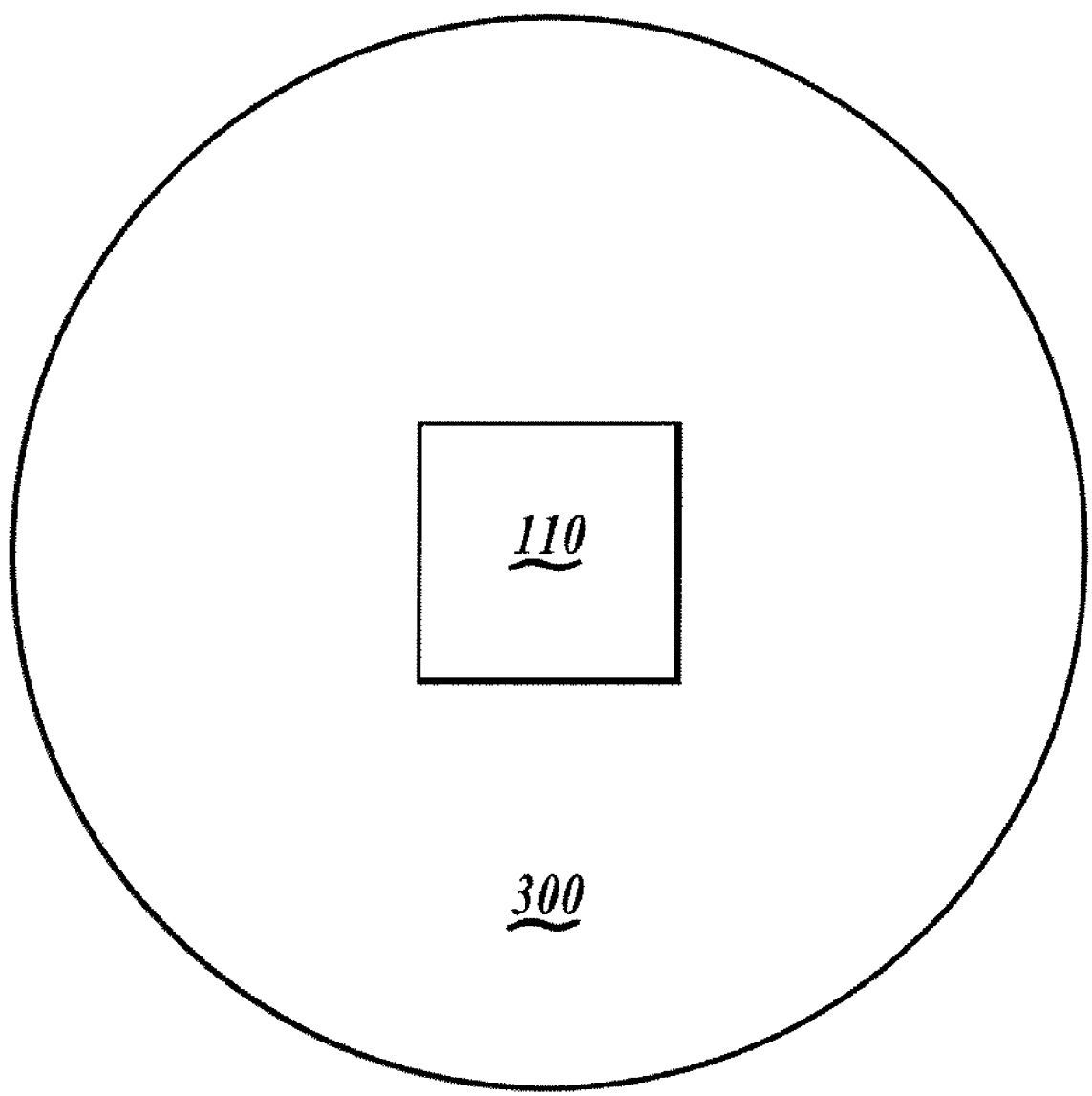
FIG. 3 is a schematic view of an exemplary operating environment in which an embodiment of the invention can be implemented.

As best illustrated in FIG. 3, the transmitter unit 110 is preferably fastened, permanently or temporarily (e.g., using one or more magnets or other more permanent fasteners such as bolts) to the center or near center of the wheel 300. Because the transmitter unit 110 is located in the center of the wheel 300, the wheel's rotational position can be calculated by the processor 150 by, for example, comparing the output from the accelerometer 130 and gyroscope 140. This position information can be transmitted by the transmitter 160 to the receiver unit 110 via radio frequency, Bluetooth™ or other wireless method when the wheel 300 is moving. The rotational speed, distance and sense of the wheel 300 can also be calculated by the processor 150.

In an embodiment, and to conserve battery energy, the processor 150 may shut down the transmitter unit 110 when the processor determines that the wheel 300 has not moved for a predetermined period of time. Additionally or alternatively, and to charge the battery 170, the transmitter unit 110 may include charging circuitry 180, such as, for example, a magnetic coil, operable to convert rotational kinetic energy associated with the moving wheel 300 into electrical energy.

Figure 2:
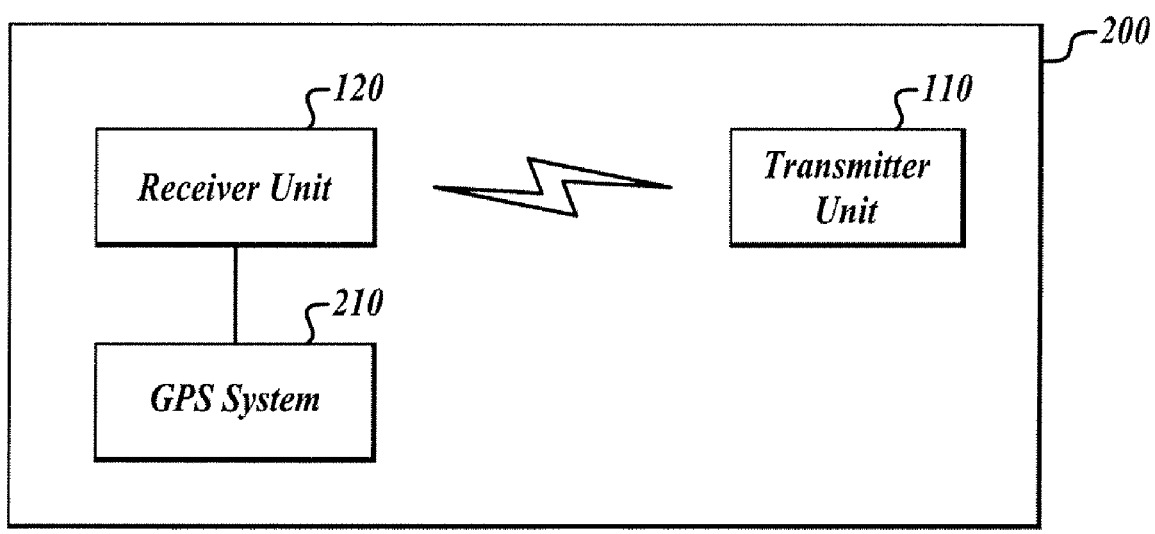
FIG. 2 is a schematic view of an exemplary operating environment in which an embodiment of the invention can be implemented.

FIG. 2 illustrates a particular application of the sensor system 100. As illustrated, the vehicle 200 includes a GPS navigational system 210, types of which are known in the art. The receiver unit 120 may be coupled to, and thus communicate with, the GPS system 210 by a conventional RS-232 connection, USB connection, or other similar and appropriate technique enabling an interface with a communication port (not shown) of the GPS system. In operation, the receiver unit 120 receives dead-reckoning information from the transmitter unit 110 in the manner described above and supplies this information to the GPS system 210. The GPS system 210 may be configured to employ data blending such that the GPS system, when the signal carrying data from navigational satellites (not shown) drops below a predetermined threshold, relies more heavily on the dead-reckoning data generated by the transmitter unit 110 than the satellite data to determine the position and heading of the vehicle 200.

In a preferred embodiment, the vehicle 200 will include a second additional transmitter unit (not shown) identical to transmitter unit 110. Each transmitter unit 110 would be placed on a respective left and right rear wheel, for example. Each left and right wheel transmitter unit 110 may measure the wheel rotational speed, namely ωL and ωR, respectively.

For wheel rotation at slow speed (e.g., less than 1 revolution (or 360°) per second), a gyroscope can be used to measure the rotational speed of the wheel (ωL and ωR). The 1 rev/s limit used in this example can be increased accordingly with a higher grade gyroscope capable of measuring higher rotational speed. The actual moving speed of the vehicle depends on the size of the wheel/tire used.

As the wheel rotation speed increases beyond the maximum speed that the gyroscope can measure, a dual-axis accelerometer can be used to measure the rotational speed of the wheels (ωL and ωR). Since the sensitive axes of the two accelerometers in the dual-axis accelerometer package are perpendicular to each other, the maximum and minimum values of each accelerometer output simulate an equally spaced 4-pulse per revolution mechanical wheel speed sensor. By keeping track of the frequency between the pulses, the rotational speed of the wheels can be measured. By keeping track of the sequence of the pulses, the rotational sense of the wheels can be determined.

For every chosen small time interval of Δt (e.g., 1 ms), transmitter units 110 send ωL and ωR to the receiver unit 120. Receiver unit 120 forwards this data to a processor (not shown) that may be associated with the receiver unit 120 and/or GPS system 210 where the vehicle's 200 distance change (Δd) and heading change (Δθv) between samples can be computed as follows:

$$\Delta d = ((\omega L * rL + \omega R * rR) * \Delta t)/2$$

Δd has same unit as rL and rR rL=radius of the left wheel rR=radius of the right wheel $$\Delta \theta v = (\omega L * rL - \omega R * rR) * \Delta t / W$$

Δθv is in radians (Rad.)

W=distance between the 2 wheels with same unit as rL and rR

If (ωL*rL−ωR*rR)>0 then the vehicle 200 has turned right Δθv since last sample.

If (ωL*rL−ωR*rR)<0 then the vehicle 200 has turned left Δθv since last sample.

If (ωL*rL−ωR*rR)=0 then the vehicle 200 has not turned since last sample.

These two parameters, Δd and Δθv, are sufficient for dead-reckoning navigation where relative position changes can be easily calculated and added to a known starting position, which may be given by another source, such as GPS or manual input, to derive the absolute position of the vehicle 200.

The vehicle's instantaneous linear velocity (υ) and acceleration (ύ) can also be calculated as follows:

$$\upsilon = \Delta d / \Delta t$$

$$\acute{\upsilon} = \Delta \upsilon / \Delta t$$

The wireless wheel sensor system 100 can be easily installed to most wheeled vehicles without the need of wiring. By installing one such transmitter unit 110 on each one of a vehicle's rear wheels, one can more easily measure the vehicle's distance traveled, either forwards or backwards, and heading direction, sufficient for dead reckoning navigation applications. Transferring the sensor system 100 from one vehicle to another can be done relatively easy compared to using the vehicle's built-in sensors or other types of wired sensors.

While a preferred embodiment of the invention has been illustrated and described, as noted above, many changes can be made without departing from the spirit and scope of the invention. For example, although an embodiment is described herein in cooperation with a GPS navigation system 210, embodiments may also be employed in conjunction with localized applications whereby a determination of absolute position is not necessary such as robotic vehicles. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system, comprising:
   a first transmitter unit operable to be mounted to a left wheel on a left side of a vehicle, comprising a first gyroscope, a first processor, a first wireless transmitter, and a first power source;
   a second transmitter unit operable to be mounted to a right wheel on a right side of the vehicle, comprising a second gyroscope, a second processor, a second wireless transmitter and a second power source; and
   a receiver unit in wireless communication with the first and second transmitter unit communicatively coupled to a third processor; and
   wherein the third processor calculates information characterizing a heading and distance traveled by the vehicle based on combining data from the first transmitter unit and the second transmitter unit.

2. The system of claim 1 wherein the receiver unit is configured to be located in the vehicle.

3. The system of claim 1 wherein:
   the first transmitter unit further comprises a first accelerometer; and
   the second transmitter unit further comprises a second accelerometer.

4. The system of claim 3 wherein the first and second accelerometers each comprise a dual-axis accelerometer.

5. The system of claim 1 wherein:
   the first transmitter unit is disposed in the center of the left wheel; and
   the second transmitter unit is disposed in the center of the right wheel.

6. The system of claim 1 wherein the first processor is operable to calculate the rotational position of the left wheel.

7. The system of claim 6 wherein the first transmitter unit is configured to transmit to the receiver unit information characterizing the position of the left wheel.

8. The system of claim 7 wherein the first transmitter unit is configured to transmit the information when the left wheel is moving.

9. The system of claim 7 wherein the information is transmitted via radio frequency.

10. The system of claim 1 wherein:
    the first processor is operable to calculate the rotational speed of the left wheel; and
    the second processor is operable to calculate the rotational speed of the right wheel.

11. The system of claim 1 wherein the first processor is operable to calculate the distance traveled by the left wheel.

12. The system of claim 1 wherein at least one of the first and second processors is operable to calculate the sense of the vehicle.

13. The system of claim 1 wherein:
    the first processor is operable to shut down power to the first transmitter unit upon determining that the left wheel has discontinued movement for a predetermined period of time; and
    the second processor is operable to shut down power to the second transmitter unit upon determining that the right wheel has discontinued movement for a predetermined period of time.

14. The system of claim 1, further comprising:
    a charging component operable to charge the first power source using rotational energy associated with the left wheel; and
    a charging component operable to charge the second power source using rotational energy associated with the right wheel.

15. The system of claim 1 where the third processor is operable to calculate the rotation position of at least one of the left wheel and the right wheel.

16. A vehicle, comprising:
    a left wheel on a left side of the vehicle and a right wheel on a right side of the vehicle;
    a receiver unit communicatively coupled to a processor; and
    a first transmitter unit in wireless communication with the receiver unit, the first transmitter unit operable to be mounted to the left wheel and comprising a first gyroscope, the first transmitter unit further operable to transmit information relating to a heading and distance traveled by the vehicle to the receiver unit; and
    a second transmitter unit in wireless communication with the receiver unit, the second transmitter unit operable to be mounted to the right wheel and comprising a second gyroscope, the second transmitter unit further operable to transmit information relating to the head and distance traveled by the vehicle to the receiver unit;
    wherein the processor calculates information characterizing the head and distance traveled by the vehicle based on combining data from the first transmitter unit and the second transmitter unit.

\* \* \* \* \*

UNITED STATES PATENT AND TRADEMARK OFFICE
CERTIFICATE OF CORRECTION

PATENT NO. : 7,714,745 B2  Page 1 of 1
APPLICATION NO. : 11/928983
DATED : May 11, 2010
INVENTOR(S) : Ron Fang It is certified that error appears in the above-identified patent and that said Letters Patent is hereby corrected as shown below:

Column 4, line 60, please replace "head" with --heading--.

Column 4, line 63, please replace "head" with --heading--.

Signed and Sealed this
Ninth Day of August, 2011

David J. Kappos
*Director of the United States Patent and Trademark Office*